Patented Nov. 24, 1953

2,660,605

UNITED STATES PATENT OFFICE 2,660,605

ANTIOXIDANTS

Thomas H. Newby, Middlebury, Conn., assignor to United States Rubber Company, New York, N. Y., a corporation of New Jersey No Drawing. Application October 12, 1951, Serial No. 251,129

9 Claims. (Cl. 260—576)

This invention relates to improvements in the manufacture of aliphatic ketone-diarylamine antioxidants, and more particularly to the composite product resulting from a conversion of the relatively hard resinous aliphatic ketone-diarylamine antioxidants, more especially such as shown in Tuley et al. U. S. Patent No. 2,202,934 and Dewey U. S. Patent No. 2,233,590.

According to the present invention, a performed solid resinous aliphatic ketone-diarylamine reaction product, especially one produced in the range of about 140 to about 160° C., is heated with an alkylated benzene in which at least one alkyl group is at least two carbons in length and having at least one hydrogen on the carbon atoms alpha and beta to the benzene ring, i. e., primary and secondary alkyls. Tert.-butyl benzene does not work; neither does toluene.

By the reaction with the said alkylated benzene, the solid ketone-amine product is converted to a mobile oily material having a viscosity of from about 10 to about 50 poises, measured at 30° C. The time and temperature may be varied, the higher the temperature, the shorter the correlative time. Generally, the temperature may be in the range from about 200° C. to about 300° C. and correlatively from about 5 to about 15 hours.

Any of the various known catalysts which are known to catalyze the condensation of aliphatic ketones with diarylamines may be used to catalyze the present conversion of the preformed ketone-amine products. Among them, but not exclusively, are especially iodine, hydriodic acid, bromine, hydrobromic acid, and the water-soluble iodides and bromides of amphoteric polyvalent metals. Included among the latter are ferrous iodide, zinc iodide, ferrous bromide, zinc bromide.

The preformed solid aliphatic ketone-diarylamine reactant may be free of catalyst which was used in its preparation (usually removed by washing with caustic soda solution), or it may be an unwashed solid condensate containing some of the original catalyst. In such a case it is optional whether addition catalyst is added for the present conversion operation.

The proportion of ketone and diarylamine may be varied within wide limits. An excess of either may be used, or they may be present in substantially equimolar proportions. It is preferred, however, to use the ketone in excess. Unreacted excess of starting reactants are desirably recovered.

The conversion reaction is conveniently carried out in a metal or glass lined vessel under atmospheric or superatmospheric pressures. In practice, the ketone-amine reaction product is mixed with 5 to 100 percent of its weight of the alkylated benzene and 0.1 to 2.0 percent of catalyst. The autoclave is sealed and heated for 5 to 15 hours at 200–300° C. after which the volatile products are vented off and the autoclave discharged. The final product is a smooth flowing viscous oil which is useful as a rubber antioxidant.

It is optional whether the resulting viscous oil is washed substantially free of halogen-containing catalyst. If desired, this may be done with dilute alkali and water.

The following examples illustrate the invention, parts being by weight:

EXAMPLE 1

A mixture of 100 parts of the acetone-diphenylamine condensate prepared according to Example 1 of U. S. Patent No. 2,202,934, 35 parts diisopropyl benzene and 1 part iodine are heated with agitation 8 hours at 250° C. At the end of this time the reaction mixture is cooled, washed with dilute sodium bicarbonate solution, and finally with water. It is dried and topped to 60° C. at 1 mm. pressure to remove the low boiling products giving a dark, mobile oily material, which is directly useful as a rubber antioxidant.

EXAMPLE 2

Example 1 is repeated using cumene in place of diisopropyl benzene and a sealed tube as a reaction vessel. A dark, mobile, oily material is obtained which is useful as a rubber antioxidant.

EXAMPLE 3

Example 1 is repeated using ethyl benzene in place of diisopropyl benzene and a sealed tube as a reaction vessel. A dark, mobile liquid is obtained which is useful as a rubber antioxidant.

Rubber testing data

The following data show the superiority of these chemicals when tested in a high grade tire tread recipe; parts being by weight.

| | |
|---|---:|
| Smoked sheet | 100.0 |
| Carbon black | 45.0 |
| Zinc oxide | 5.0 |
| Pine tar | 3.5 |
| Lauric acid | 3.5 |
| Sulfur | 3.0 |
| Mercaptobenzothiazole | 1.0 |
| Antioxidant | 1.0 |

Cure: Sixty minutes at 30 lbs. per square inch steam pressure. Samples were cut and tested for their flexing ability based on an index of 100 for the control.

| | Flex rating |
|---|---|
| Control | 100 |
| Acetone-diphenylamine condensate of U. S. Patent No. 2,202,934 | 160 |
| Diisopropyl benzene derivative | 220 |
| Cumene derivative | 217 |
| Ethyl benzene derivative | 214 |

The product of reaction is characterized by a viscosity in the range of 10 to 50 poises, and a volatility generally in the range of 75–85% to a distillation temperature of 150° C. at 1 mm. pressure. This is in contrast to the intermediate ketone-amine product which is substantially non-volatile or not more than about 13% under the same temperature conditions.

Other amines suitable for reaction with the ketone, for the purposes of the present invention, include N,N'-diphenyl p-phenylene diamine, ditolylamine, dixylylamine, phenyl tolylamine, dinaphthylamine, phenyl alpha naphthylamine, phenyl betanaphthylamine. The ketones that may be reacted with the diphenylamine and any of the above amines, includes methyl ethyl ketone, methyl propyl ketone, methyl butyl ketone, diethyl ketone, mesityl oxide, phorone, dimethyl ketone, dipropyl ketone, dibutyl ketone.

In addition to the alkylated benzenes referred to above, other alkylated benzenes may be used, for example, n-propyl benzene, n-amyl benzene, n-hexyl benzene, isobutyl benzene, isoamyl benzene, diethyl benzene, n-butyl benzene, diisobutyl benzene, di-n-butyl benzene, di-n-amyl benzene, triethyl benzene, tributyl benzene, 1-methyl 4-isopropyl benzene, tetraethyl benzene, pentaethyl benzene, etc.

The chemicals prepared by this invention, as indicated above, are useful in imparting increased flex-cracking resistance to natural rubbers as well as to the various similar vulcanizable (sulfur-reactive) synthetic rubbers, which includes such rubbery materials as the butadiene-styrene copolymer, the butadiene-acrylonitrile copolymer, the copolymer of isobutylene with a small amount of isoprene, etc.

Having thus described my invention, what I claim and desire to protect by Letters Patent is:

1. A method which comprises heating a solid composite aliphatic ketone-diarylamine condensate with an alkylated benzene in which at least one alkyl group is at least two carbons in length and having at least one hydrogen on the carbon atoms alpha and beta to the benzene ring, for a time and at a temperature in the range from about 200 to about 300° C. sufficient to convert the original solid composite condensate to a mobile oily liquid, characterized as having a viscosity in the range of 10 to 50 poises at 30° C., said heating being carried out in the presence of a catalyst capable of condensing aliphatic ketones with diarylamines.

2. A method which comprises heating a solid composite acetone-diphenylamine condensate with an alkylated benzene in which at least one alkyl group is at least two carbons in length and having at least one hydrogen on the carbon atoms alpha and beta to the benzene ring, for a time and at a temperature in the range from about 200 to about 300° C. sufficient to convert the original solid composite condensate to a mobile oily liquid, characterized as having a viscosity in the range of 10 to 50 poises at 30° C., said heating being carried out in the presence of a catalyst capable of condensing aliphatic ketones with diarylamines.

3. A method which comprises heating a solid composite aliphatic ketone-diarylamine condensate with diisopropyl benzene, for a time and at a temperature in the range from about 200 to about 300° C. sufficient to convert the original solid composite condensate to a mobile oily liquid characterized as having a viscosity in the range of 10 to 50 poises at 30° C., said heating being carried out in the presence of a catalyst capable of condensing aliphatic ketones with diarylamines.

4. A method which comprises heating a solid composite aliphatic ketone-diarylamine condensate with isopropyl benzene, for a time and at a temperature in the range from about 200 to about 300° C. sufficient to convert the original solid composite condensate to a mobile oily liquid characterized as having a viscosity in the range of 10 to 50 poises at 30° C., said heating being carried out in the presence of a catalyst capable of condensing aliphatic ketones with diarylamines.

5. A method which comprises heating a solid composite aliphatic ketone-diarylamine condensate with ethyl benzene, for a time and at a temperature in the range from about 200 to about 300° C. sufficient to convert the original solid composite condensate to a mobile oily liquid characterized as having a viscosity in the range of 10 to 50 poises at 30° C., said heating being carried out in the presence of a catalyst capable of condensing aliphatic ketones with diarylamines.

6. A modified aliphatic ketone-diarylamine reaction product resulting from a process as set forth in claim 1.

7. A modified aliphatic ketone-diarylamine reaction product resulting from a process as set forth in claim 3.

8. A modified aliphatic ketone-diarylamine reaction product resulting from a process as set forth in claim 4.

9. A modified aliphatic ketone-diarylamine reaction product resulting from a process as set forth in claim 5.

THOMAS H. NEWBY.

References Cited in the file of this patent

UNITED STATES PATENTS

| Number | Name | Date |
|---|---|---|
| 2,183,567 | Howland | Dec. 19, 1939 |
| 2,216,524 | Sibley | Oct. 1, 1940 |
| 2,303,708 | Sibley | Dec. 1, 1942 |
| 2,306,830 | Paul | Dec. 29, 1942 |